(12) United States Patent
Dong (10) Patent No.: US 12,175,939 B2
(45) Date of Patent: Dec. 24, 2024

(54) DRIVING METHOD AND DISPLAY DEVICE (71) Applicants: Chengdu BOE Optoelectronics Technology Co., Ltd., Chengdu (CN); BOE Technology Group Co., Ltd., Beijing (CN)

(72) Inventor: Hang Dong, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/246,051

(22) PCT Filed: Apr. 29, 2022

(86) PCT No.: PCT/CN2022/090471
§ 371 (c)(1),
(2) Date: Mar. 21, 2023

(87) PCT Pub. No.: WO2023/206422
PCT Pub. Date: Nov. 2, 2023

(65) Prior Publication Data
US 2024/0144886 A1    May 2, 2024

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2310/08* (2013.01); *G09G 2330/028* (2013.01)

(58) Field of Classification Search
CPC ............... G09G 3/3266; G09G 3/3258; G09G 2310/08; G09G 2330/028; G09G 2300/0426; G09G 2300/0814; G09G 2300/0819; G09G 2300/0861; G09G 2300/0866; G09G 2320/045; G09G 3/3233; G02F 1/1362; G09F 9/30
See application file for complete search history.

(56) References Cited

U.S. PATENT DOCUMENTS

| 9,286,821 | B2 | 3/2016 | Wu et al. |
| 10,818,230 | B1 | 10/2020 | Lu |
| 11,205,363 | B2 | 12/2021 | Choi et al. |
| 11,222,578 | B2 * | 1/2022 | Kim ........................ G09G 3/20 |
| 2004/0252093 | A1 | 12/2004 | Park |

(Continued)

FOREIGN PATENT DOCUMENTS

| CN | 1620628 A | 5/2005 |
| CN | 101034527 A | 9/2007 |

(Continued)

*Primary Examiner* — Jose R Soto Lopez
(74) *Attorney, Agent, or Firm* — Westman, Champlin & Koheler, P.A.

(57) ABSTRACT

The present disclosure provides a driving method, and relates to a field of display technology. The driving method is used to drive a pixel array, and the driving method includes operation to operation: in operation, setting a timing of a gate driving signal (Gate) based on an effective time difference between a data signal (Vdata) and an effective signal of the gate driving signal (Gate); and in operation, driving the pixel array by using the gate driving signal (Gate). The present disclosure further provides a display device.

18 Claims, 7 Drawing Sheets

```
                                              ┌─ S210
┌─────────────────────────────────────────────┐
│ A timing of a gate driving signal is set based on an │
│ effective time difference between a data signal and  │
│   an effective signal of the gate driving signal     │
└─────────────────────────────────────────────┘
                        │
                        ▼                     ┌─ S220
┌─────────────────────────────────────────────┐
│   A pixel array is driven by using the gate driving │
│                      signal                          │
└─────────────────────────────────────────────┘
```

(56) References Cited

U.S. PATENT DOCUMENTS

| | | | |
|---|---|---|---|
| 2005/0174344 A1 | 8/2005 | La | |
| 2007/0085798 A1* | 4/2007 | Hashimoto | G09G 3/3648 345/93 |
| 2007/0210999 A1 | 9/2007 | Lee | |
| 2008/0062092 A1 | 3/2008 | Kanda | |
| 2009/0278832 A1* | 11/2009 | Cho | G09G 3/3648 345/211 |
| 2012/0105423 A1* | 5/2012 | Chung | G09G 3/3266 345/212 |
| 2012/0162185 A1* | 6/2012 | Park | G09G 3/3611 345/212 |
| 2015/0154901 A1 | 6/2015 | Wu et al. | |
| 2015/0302816 A1* | 10/2015 | Won | G09G 3/3681 345/87 |
| 2016/0111051 A1* | 4/2016 | Jeon | G09G 3/3674 345/204 |
| 2016/0118006 A1* | 4/2016 | Park | G09G 3/3666 345/77 |
| 2016/0133215 A1* | 5/2016 | Yeo | G09G 3/3648 345/95 |
| 2016/0300544 A1* | 10/2016 | Ding | G09G 3/006 |
| 2016/0365066 A1* | 12/2016 | Lim | G09G 3/2096 |
| 2018/0033381 A1* | 2/2018 | Hwang | G09G 3/3688 |
| 2018/0330655 A1* | 11/2018 | Tsuchi | G09G 3/3275 |
| 2018/0366081 A1 | 12/2018 | Jangda et al. | |
| 2019/0114979 A1 | 4/2019 | Hou et al. | |
| 2019/0206353 A1* | 7/2019 | Zhang | G09G 3/3677 |
| 2019/0392773 A1* | 12/2019 | Higuchi | G09G 3/3677 |
| 2020/0388235 A1* | 12/2020 | Zhou | G09G 3/3677 |
| 2021/0118349 A1 | 4/2021 | Choi et al. | |
| 2021/0183328 A1* | 6/2021 | Taniguchi | G09G 3/3266 |
| 2021/0407442 A1 | 12/2021 | Yang et al. | |

FOREIGN PATENT DOCUMENTS

| | | |
|---|---|---|
| CN | 102214440 A | 10/2011 |
| CN | 102768817 A | 11/2012 |
| CN | 103177682 A | 6/2013 |
| CN | 106710557 A | 5/2017 |
| CN | 107068095 A | 8/2017 |
| CN | 111883057 A | 11/2020 |
| CN | 112687219 A | 4/2021 |
| CN | 113781961 A | 12/2021 |
| CN | 114038418 A | 2/2022 |
| CN | 114038419 A | 2/2022 |
| CN | 114038423 A | 2/2022 |
| JP | H09237066 A | 9/1997 |

* cited by examiner

DRIVING METHOD AND DISPLAY DEVICE

CROSS-REFERENCE TO RELATED APPLICATION

This application is a Section 371 National Stage Application of International Application No. PCT/CN2022/090471, filed on Apr. 29, 2022, entitled "DRIVING METHOD AND DISPLAY DEVICE", the entire content of which is incorporated herein by reference in its entirety.

TECHNICAL FIELD

The present disclosure relates to a field of display technology, in particular to a driving method and a display device.

BACKGROUND

A display device (such as an OLED display) may include a display panel, a gate driver, a data driver, and a timing controller. The display panel includes a pixel array composed of a plurality of pixels, a gate driving signal generated by the gate driver is provided to a pixel row, and the data driver provides a data voltage to a pixel.

However, a change of the data signal will cause a fluctuation of a power supply voltage, which will cause a crosstalk phenomenon during the image display of the display panel and affect the display quality of the display panel.

SUMMARY

The present disclosure provides a driving method and a display device.

According to a first aspect, the present disclosure provides a driving method, including: setting a timing of a gate driving signal based on an effective time difference between a data signal and an effective signal of the gate driving signal; and driving the pixel array by using the gate driving signal.

For example, the effective time difference includes a first time difference between an application time instant of the data signal and a start time instant of an effective level of the gate driving signal, and setting the timing of the gate driving signal based on the effective time difference includes: setting the timing of the gate driving signal such that the first time difference is greater than 0.5 times of the effective time difference and less than the effective time difference, while maintaining a duration of the data signal and a duration of the effective level of the gate driving signal.

For example, a ratio of the effective time difference to a scanning period of the gate driving signal ranges from 35% to 45%.

For example, the ratio of the effective time difference to the scanning period of the gate driving signal is 39%.

For example, a ratio of the first time difference to a scanning period of the gate driving signal ranges from 22% to 37%.

For example, the scanning period of the gate driving signal is 8.7 μs, and the first time difference ranges from 1.9 μs to 3.2 μs.

For example, the first time difference is greater than a jumping time of a power supply voltage.

For example, the driving method further setting a duration of a latch input period based on the effective time difference such that a time difference between an end time instant of the latch input period and a start time instant of an effective level of a gate driving signal in a next scanning period is greater than 0.5 times of the effective time difference and less than the effective time difference.

For example, the method according to embodiments of the present disclosure further includes: a first driving mode, where the first time difference is A1; and a second driving mode, where the first time difference is A2, and A1 is greater than A2.

According to a second aspect, the present disclosure provides a display device, including: a pixel array; a timing controller; a source driver configured to generate a data signal under control of the timing controller; and a gate driver configured to generate a gate driving signal under control of the timing controller, where the timing controller is configured to set a timing of the gate driving signal based on an effective time difference between the data signal and an effective signal of the gate driving signal, so as to drive the pixel array by using the gate driving signal.

For example, the effective time difference includes a first time difference between an application time instant of the data signal and a start time instant of an effective level of the gate driving signal; and the timing controller is further configured to: set the timing of the gate driving signal so that the first time difference between the application time instant of the data signal and the start time instant of the effective level of the gate driving signal is greater than 0.5 times of the effective time difference and less than the effective time difference, while maintaining a duration of the data signal and a duration of the effective level of the gate driving signal.

For example, a ratio of the effective time difference to a scanning period of the gate driving signal ranges from 35% to 45%.

For example, a ratio of the effective time difference to a scanning period of the gate driving signal is 39%.

For example, a ratio of the first time difference to a scanning period of the gate driving signal ranges from 22% to 37%.

For example, the scanning period of the gate driving signal is 8.7 μs, and the first time difference ranges from 1.9 μs to 3.2 μs.

For example, the first time difference is greater than a jumping time of a power supply voltage.

For example, the timing controller is further configured to set a duration of a latch input period based on the effective time difference, such that a time difference between an end time instant of the latch input period and a start time instant of an effective level of a gate driving signal in a next scanning period is greater than 0.5 times of the effective time difference and less than the effective time difference.

For example, the display device according to embodiments of the present disclosure further includes an external power supply provided between the pixel array and a voltage source of the source driver.

For example, the display device according to embodiments of the present disclosure further includes a resistor provided between the pixel array and a voltage source of the source driver.

For example, the timing controller is further configured to set: a first driving mode, where the first time difference is A1; and a second driving mode, where the first time difference is A2, and A1 is greater than A2.

DETAILED DESCRIPTION OF EMBODIMENTS

In order to make objectives, technical solutions and advantages of embodiments of the present disclosure more clear, technical solutions in embodiments of the present disclosure will be described clearly and completely with reference to the accompanying drawings. It is obvious that the embodiments described are only some embodiments of the present disclosure, rather than all embodiments. All other embodiments obtained by those of ordinary skill in the art from the embodiments in the present disclosure without carrying out inventive effort fall within the scope of the present disclosure. It should be noted that throughout the accompanying drawings, the same elements are represented by the same or similar reference signs. In the following description, some specific embodiments are for illustrative purposes only and should not be construed as limiting the present disclosure in any way, but merely as examples of embodiments of the present disclosure. Conventional structures or constructions will be omitted when they may obscure the understanding of the present disclosure. It should be noted that shapes and sizes of the respective components in the figures do not reflect true sizes and proportions, but merely illustrate the embodiments of the present disclosure.

Unless otherwise defined, technical terms or scientific terms used in the present disclosure should be given their ordinary meaning as understood by those skilled in the art. The use of "first", "second" and the like in the embodiments of the present disclosure is not intended to indicate any order, quantity or importance, but rather is used to distinguish different components.

In addition, in the description of embodiments of the present disclosure, terms "connected with" or "connected to" may mean that two components are directly connected, or that two components are connected via one or more other components. Furthermore, the two components may be connected or coupled by wire or wirelessly.

It should be noted that in the description of the embodiments of the present disclosure, a symbol Vdata may represent both a data signal and a level of the data signal. Similarly, a symbol Gate may represent both a gate driving signal and a level of the gate driving signal, a symbol VINT may represent both a predetermined initial voltage terminal and a voltage of an initial signal, and a symbol ELVDD may represent both a power supply and a power supply voltage provided by the power supply. The following embodiments are the same as above, which will not be repeated.

Figure 1A:
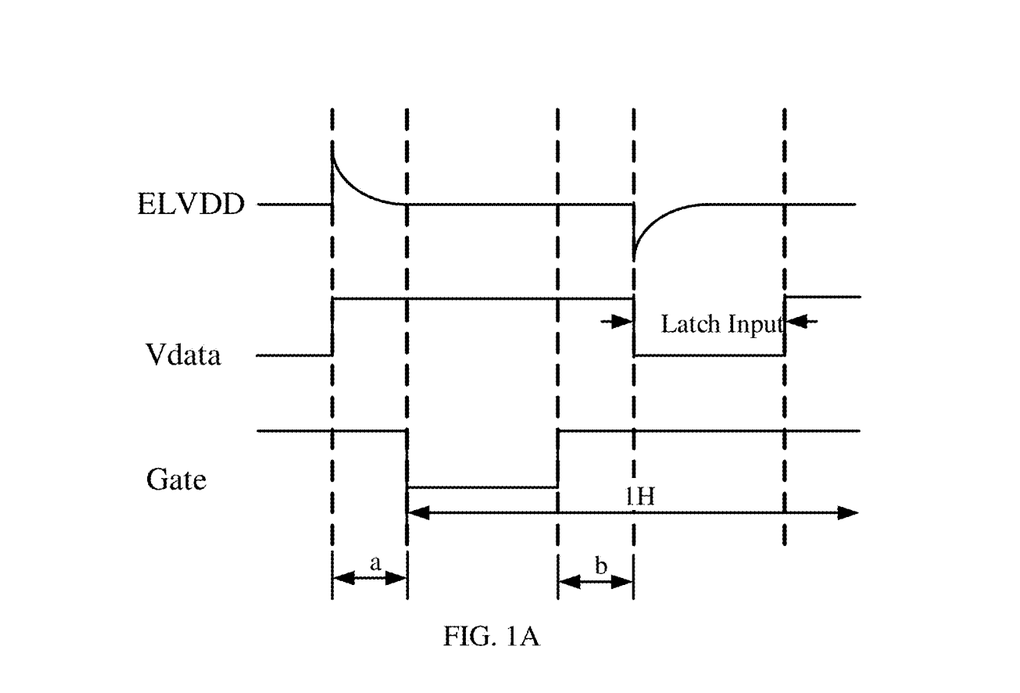
FIG. 1A shows a signal timing diagram for driving a display panel according to an example.
Figure 1B:
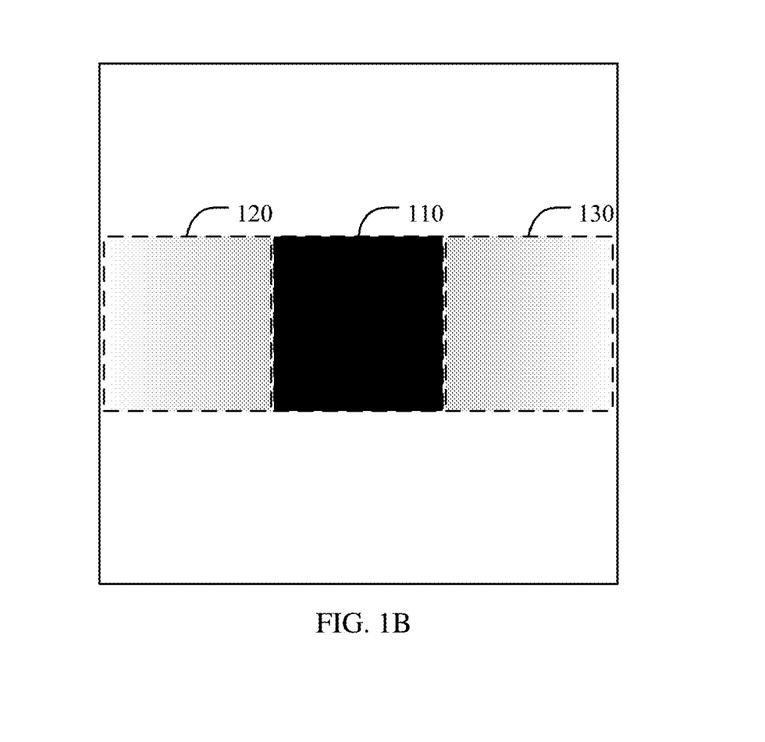
FIG. 1B shows a schematic diagram of an abnormal image display of a display device driven by using the signal timing diagram in FIG. 1A.

FIG. 1A shows a signal timing diagram for driving a display panel according to an example. FIG. 1B shows a schematic diagram of an abnormal image display of a display device driven by using the signal timing diagram in FIG. 1A.

As shown in FIG. 1A, when a data signal Vdata is applied, a change of a reference voltage AVDD of the data signal Vdata may cause jumping of a power supply voltage VDD. Period a may be a period from a time instant at which the data signal Vdata is applied to a time instant at which an effective level of a gate driving signal Gate starts, and period b may be a period from a time instant at which the effective level of the gate driving signal Gate ends to a time instant at which the application of the data signal Vdata ends. At the start time instant of the gate effective level of the gate driving signal, i.e., in the period a, since a noise caused by the jumping of the power supply voltage VDD is not eliminated, a crosstalk phenomenon will occur to the image display of a display panel, which may affect the display quality of the display panel.

As shown in FIG. 1B, the display panel includes a pixel unit 110, a pixel unit 120, and a pixel unit 130. During a display process, the gate driving signal Gate scans the pixel units row by row. The data signal Vdata is applied, such that the pixel unit 110 displays a black image, and the pixel unit 120 and the pixel unit 130 display white images. Due to the noise caused by the jumping of the power supply voltage VDD, the pixel unit 120 and the pixel unit 130 are affected by crosstalk between them and the pixel unit 110, so that gray images are actually displayed by the pixel unit 120 and the pixel unit 130, thereby affecting the display quality of the display panel.

The present disclosure provides a driving method for driving a pixel array, including: setting a timing of a gate driving signal based on an effective time difference between a data signal and an effective signal of the gate driving signal; and driving the pixel array by using the gate driving signal.

Figure 2:
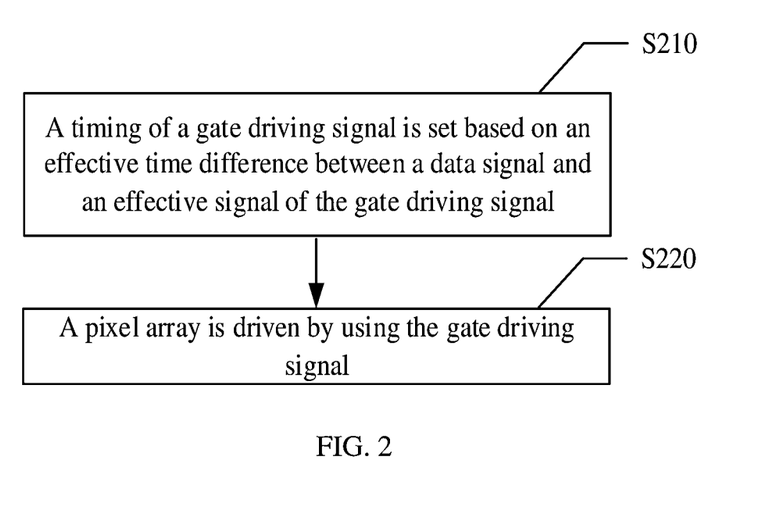
FIG. 2 shows a flowchart of a driving method according to an embodiment of the present disclosure.

FIG. 2 shows a flowchart of a driving method according to an embodiment of the present disclosure.

As shown in FIG. 2, the driving method may include operation S210 to operation S220.

In operation S210, the timing of the gate driving signal is set based on the effective time difference between the data signal and the effective signal of the gate driving signal.

For example, a duration of the data signal is longer than a duration of an effective level of the gate driving signal, which may avoid a failure of data signal writing when the driving transistor is on. In a scanning period, an application time instant of the data signal is before a start time instant of the effective level of the gate driving signal, and an end time instant of the application of the data signal is after an end time instant of the effective level of the gate driving signal. A ratio of the effective time difference to the scanning period of the gate driving signal ranges from 35% to 45%. Reference may be made to the effective time difference between the data signal and the effective signal of the gate driving signal shown in FIG. 1A, where the effective time difference includes the period a and the period b. The scanning period of the gate driving signal is 1H, for example, the scanning period of the gate driving signal is the time required for the scanning of one row of the pixel array.

For example, for any pixel array, the effective time difference may be fixed. Setting the timing of the gate driving signal based on the effective time difference may completely eliminate the noise caused by the jumping of the power supply voltage VDD before the start time instant of the effective level of the gate driving signal, so that the crosstalk phenomenon of the display panel may be alleviated.

In operation 220, the pixel array is driven by using the gate driving signal.

For example, the display panel includes the pixel array. By setting the timing of the gate driving signal according to the embodiments of the present disclosure and using the gate driving signal to drive the pixel array, it is possible to alleviate the crosstalk phenomenon on the display panel.

According to the embodiments of the present disclosure, the noise caused by the jumping of the power supply voltage VDD may be completely eliminated before the start time instant of the effective level of the gate driving signal, and the crosstalk phenomenon of the display panel may be alleviated.

The present disclosure provides an embodiment of setting the timing of the gate driving signal. The effective time difference includes a first time difference between the application time instant of the data signal and the start time instant of the effective level of the gate driving signal.

In operation S210, a step of setting the timing of the gate driving signal based on the effective time difference between the data signal and the effective signal of the gate driving signal includes: setting the timing of the gate driving signal such that the first time difference is greater than 0.5 times of the effective time difference and less than the effective time difference, while maintaining a duration of the data signal and a duration of the effective level of the gate driving signal. A ratio of the first time difference to the scanning period of the gate driving signal ranges from 22% to 37%.

Figure 3:
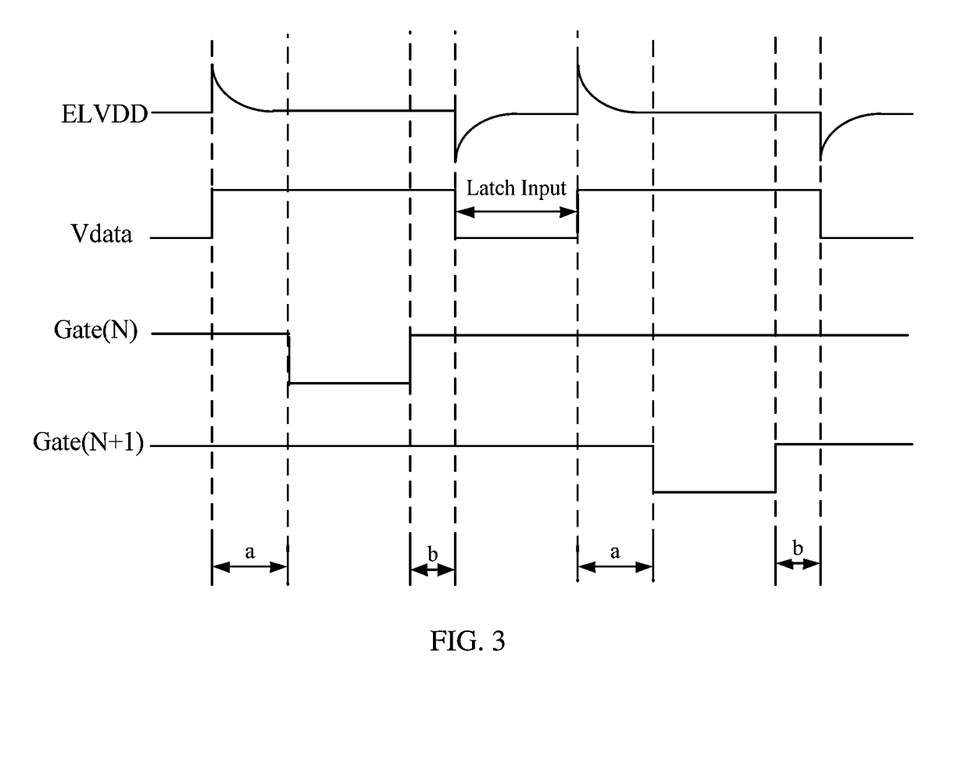
FIG. 3 shows a signal timing diagram according to an embodiment of the present disclosure.

FIG. 3 shows a signal timing diagram according to an embodiment of the present disclosure. As shown in FIG. 3, a low level of the gate driving signal is the effective level. In an example of FIG. 3, Gate (N) represents a gate signal for an $N^{th}$ row of pixels, and Gate (N+1) represents a gate signal of an $(N+1)^{th}$ row of pixels, where N is an integer greater than or equal to 1. The first time difference is the period a, and the first time difference is greater than 0.5 times of the effective time difference and less than the effective time difference. The effective time difference further includes a second time difference between the end time instant of the effective level of the gate driving signal and the end time instant of the application of the data signal. The second time difference is the period b, and the second time difference b is less than 0.5 times of the effective time difference and greater than 0.

For example, for a normal timing of the gate driving signal, each of the first time difference and the second time difference may be equal to 0.5 times of the effective time difference. For example, for a default timing of the gate driving signal, the effective time difference between the duration of the effective level of the gate driving signal and the duration of the data signal is 3.4 µs, and each of the first time difference and the second time difference is 1.7 µs. As such, it may be considered that a default value of the first time difference and the second time difference may be 0.5 times of the effective time difference, such as 1.7 µs. While maintaining the duration of the effective level of the gate driving signal, the first time difference may be increased by delaying the start time instant of the effective level of the gate driving signal such that the first time difference is greater than 0.5 times of the effective time difference and less than the effective time difference.

The first time difference may be greater than a duration of the jumping of the power supply voltage. When the first time difference is large enough, the noise caused by the jumping of the power supply voltage VDD may be completely eliminated before the start time instant of the effective level of the gate driving signal, so as to alleviate the crosstalk phenomenon of the display panel.

Optionally, the first time difference is 1.2 times to 2.4 times of the jumping time of the power supply voltage VDD, which may better ensure that the noise caused by the jumping of the power supply voltage VDD may be completely eliminated before the start time instant of the effective level of the gate driving signal. For example, the first time difference is 2.4 µs to 3.2 µs, greater than the duration of the jumping of the power supply voltage of 2.0 µs.

Since the duration of the data signal and the duration of the effective level of the gate driving signal are unchanged, the effective time difference (the period a and the period b) may be considered unchanged. When the first time difference (the period a) increases with respect to the default value (the first time difference being 0.5 times of the effective time difference), the second time difference (the period b) be reduced accordingly. In addition, the first time difference needs to be less than the effective time difference. If the first time difference is increased without limitation, the second time difference will not exist. That is, the end time instant of the application of the data signal is before the end time instant of the effective level of the gate driving signal, resulting in no data signal being written when the driving transistor is on.

The present disclosure provides a driving method according to another embodiment. On the basis of operation S210 to operation S220, the driving method further includes setting a duration of a latch input period based on the effective time difference such that a time difference between an end time instant of the latch input period and a start time instant of an effective level of a gate driving signal in a next scanning period is greater than 0.5 times of the effective time difference and less than the effective time difference.

An interval between two adjacent data signals is the latch input period Latch input. Changing the latch input period Latch input may lead to a change in a frequency of the data signal, which may in turn change an application time instant of a data signal in the next scanning period. For example, reducing the latch input period Latch input may cause an advance of the application time instant of the data signal in the next scanning period. In addition, a change of the latch input period Latch input may also cause a change of the reference voltage AVDD of the data signal, which may in turn change a jumping time point of the power supply voltage signal VDD.

Figure 4:
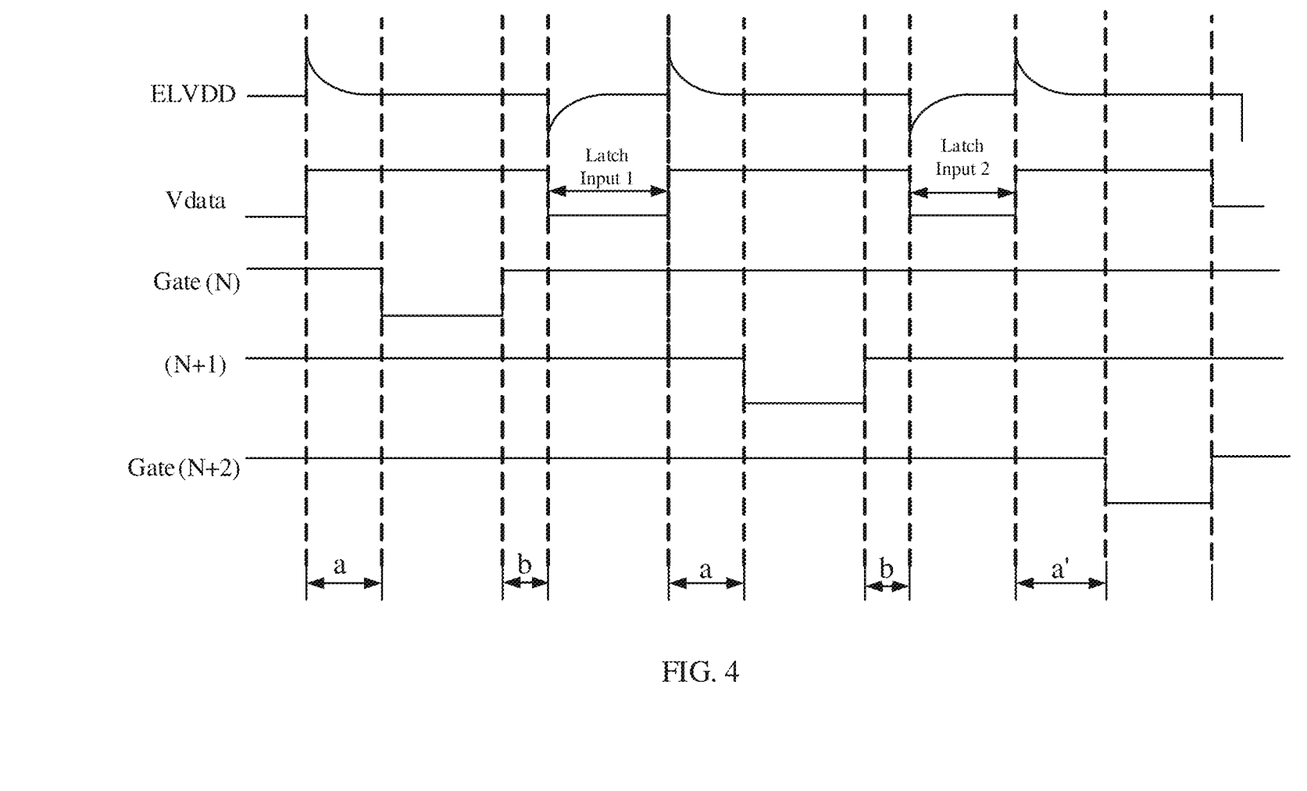
FIG. 4 shows a signal timing diagram according to another embodiment of the present disclosure.

FIG. 4 shows a signal timing diagram according to another embodiment of the present disclosure. In an example of FIG. 4, Gate (N) represents the gate signal for the $N^{th}$ row of pixels, Gate (N+1) represents the gate signal for the $(N+1)^{th}$ row of pixels, and Gate (N+2) represents the gate signal for a $(N+2)^{th}$ row of pixels. As shown in FIG. 4, a duration of a first latch input period of a normal timing of the data signal is Latch input 1. For example, the signal timing diagram shown in FIG. 4 may be obtained by setting the timing of the gate driving signal first, and then setting the duration of the latch input period, while maintaining the duration of the effective level of the gate driving signal. The timing of the gate driving signal is first set so that the first time difference (the period a) is greater than 0.5 times of the effective time difference and less than the effective time difference. The duration of the second latch input period is then set as Latch input 2. The duration of the second latch input period Latch input 2 is shorter than the duration of the first latch input period Latch input 1, so that the first time difference (a period a') between the application start time instant of the data signal for the $(N+1)^{th}$ row of pixels and the start time instant of the effective level of the next row of gate driving signal Gate (N+1) is greater than the first time difference (the period a) between the application start time instant of the data signal for the $N^{th}$ row of pixels and the start time instant of the effective level of the $N^{th}$ row of gate driving signal Gate (N). The second time difference a' is also greater than 0.5 times of the effective time difference and less than the effective time difference.

It should be noted that FIG. 4 is only intended to show the change of the first time difference due to the change of duration of the latch input period. Optionally, in an actual drive application, after the setting of the duration of the latch input period, the duration of the latch input period is unchanged. For example, in an embodiment of the present disclosure, the duration of the latch input period in the timing of the data signal is set to Latch input 2.

For example, in the driving method, the duration of the latch input period may also be set without changing the default timing of the gate driving signal, so that the time difference between the end time instant of the latch input period and the start time instant of the effective level of the gate driving signal in the next scanning period is greater than 0.5 times of the effective time difference and less than the effective time difference.

For example, the duration of the latch input period in the above-mentioned normal timing of the data signal may be 1.5 μs. The first time difference may be increased by reducing the duration of the latch input period, while maintaining the application duration of the data signal and the normal timing of the gate driving signal, so that the first time difference is greater than 0.5 times of the effective time difference and less than the effective time difference. The duration of the latch input period may be set to be in a range of 1.2 μs to 0.3 μs.

Optionally, the duration of the latch input period may be set to be 0.4 μs.

Optionally, a length of an overlap between the application duration of the data signal and a turning-on duration of the gate driving signal may be fixed. In this way, it may be ensured that when the gate driving signal is transmitted to each row, the application time of the effective data signal is substantially the same.

Figure 5A:
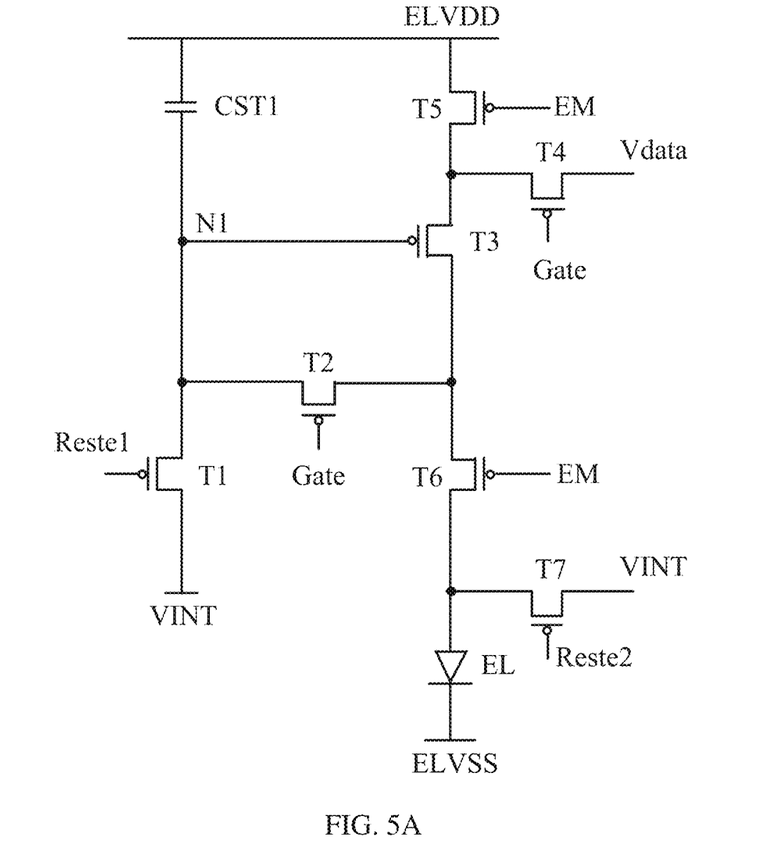
FIG. 5A shows a schematic structural diagram of a pixel circuit according to an embodiment of the present disclosure.
Figure 5B:
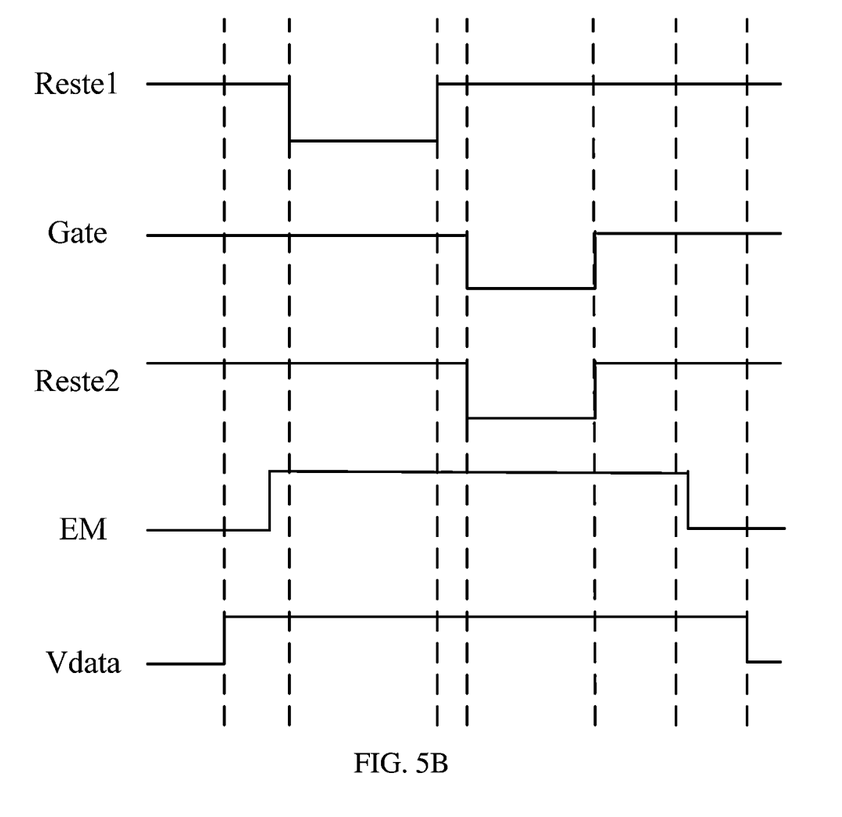
FIG. 5B shows a signal timing diagram for the pixel circuit in FIG. 5A.

FIG. 5A shows a structural diagram of a pixel circuit according to an embodiment of the present disclosure. FIG. 5B shows a signal timing diagram for the pixel circuit in FIG. 5A.

As shown in FIG. 5A and FIG. 5B, in the example of FIG. 5A, transistors T1 to T7 may be P-type transistors. In an initialization stage, a low level of a reset signal Reste1 is an effective level.

Under the control of the reset signal Reste1, the transistor T1 is turned-on. An initialization signal VINT initializes a gate electrode of the driving transistor T3, so as to initialize a voltage of the gate electrode of the driving transistor T3 to VINT and charge a storage capacitor CST.

In a data writing stage, a low level of the gate driving signal Gate and a low level of the reset signal Reste2 are effective levels. Under the control of gate driving signal Gate, the transistor T2 and the transistor T4 are turned on. The driving transistor T3 is turned on by the voltage signal stored in the storage capacitor CST. The data signal Vdata is transmitted from a data signal terminal to a node N1 via the transistor T4, the transistor T3, and the transistor T2, so as to be written to the node N1. Under the control of the reset signal Reste2, the transistor T7 is turned on, and the initialization signal VINT is written to an anode of a light-emitting element EL along an initialization path from a predetermined initial voltage terminal to the light-emitting element EL, so that the voltage of the anode of the light-emitting element EL is initialized to VINT.

It may be understood that a voltage difference (VINT−ELVSS) between the initial signal terminal VINT and a second power terminal ELVSS should be less than a threshold voltage Voled of the light-emitting element EL. ELVSS is a voltage of a second terminal of the light-emitting element OLED, and Voled is a light emission threshold voltage of the light-emitting element EL. In this way, it may be ensured that the light emitting element EL does not emit light during the data writing stage.

In a light emission stage, a low level of a light emission control signal EM is an effective level. Under the control of the light emission control signal EM, the transistor T5 and the transistor T6 are turned-on. The driving transistor T3 is turned on by the voltage signal stored in the storage capacitor CST. As the transistor T5 and the transistor T6 are turned on, a driving current is applied to the light-emitting element EL along a light emission path from the power supply to the light-emitting element EL via the transistor T5, the driving transistor T3, and the transistor T6, so as to drive the light-emitting element EL to emit light.

The present disclosure may also be applicable to other pixel circuits. For example, the transistor T1 and the transistor T2 may be N-type transistors, and the transistors T3 to T7 may be P-type transistors.

For example, a crosstalk test is performed on a display panel including the pixel circuit shown in FIG. 5A. In an example, a display scanning frame frequency is 60 Hz, and the resolution rows of the display panel are 1915 rows. Accordingly, the scanning period 1H of the gate driving signal Gate is equal to 8.7 μs, the effective time difference of (a+b) is equal to 3.4 μs, and the default value of the first time difference a and the default value of the second time difference b are 1.7 μs. In this case, the ratio of the effective time difference to the scanning period of the gate driving signal is 39%.

Optionally, the scanning period H of the gate driving signal Gate may be determined by the scanning frame frequency and the number of the resolution rows of the display panel. For example, the scanning frame frequency is 60 Hz, and the resolution rows of the display panel are 1915 rows. It should be noted that the resolution rows of the display panel may include real rows and dummy rows. For example, there are 1888 real rows and 27 dummy rows. The gate driving signal is first used for scanning the dummy rows, and then used for scanning the real rows. The scanning period of the gate driving signal Gate may be calculated as follows: 1H=1/F=1/(60*1915)=8.7 μs, where F is a product of a drive frequency and the number of the resolution rows.

Other drive frequencies or resolutions are applicable in some embodiments. Optionally, the display panel may also have other resolutions, such as 10 HZ to 30 HZ, or 90 HZ to 120 HZ, or may have other resolutions, for example, the resolution rows are 2360 rows.

Optionally, the value of the first time difference a and the value of the second time difference b may be changed by setting the timing of the gate driving signal and/or setting the duration of the latch input period. For example, the first time difference a is about 22% to 37% of 1/F, where F is the product of the drive frequency and the number of the resolution rows. According to the embodiments of the present disclosure, a ratio of the first time difference a to the second time difference b may be changed by setting the timing of the gate driving signal and/or setting the duration of the latch input period. In order to test the crosstalk phenomenon under different ratios of a to b, the crosstalk test is performed on the display panel including the pixel circuit shown in FIG. 5A by using the driving method shown in the embodiments of the present disclosure, and the test results are shown in Table 1. The ratio a/b of the first time difference to the second time difference during the test ranges from 0.0625 to 16. The lower the crosstalk level, the more serious the crosstalk phenomenon.

TABLE 1

| a | 3.2 | 3.0 | 2.5 | 2.0 | 1.7 | 1.4 | 0.9 | 0.4 | 0.2 |
|---|---|---|---|---|---|---|---|---|---|
| b | 0.2 | 0.4 | 0.9 | 1.4 | 1.7 | 2.0 | 2.5 | 3.0 | 3.2 |
| Crosstalk level | 4 | 3 | 2 | 4 | 0 | −1 | −2 | −3 | −4 |

As shown in Table 1, starting from the default value, where there is a=b=1.7 μs, the crosstalk phenomenon is gradually alleviated as the ratio a/b increases. When there are a/b=16 and a=3.2 μs, the crosstalk level reaches the highest. As the ratio a/b decreases, the crosstalk level decreases and the crosstalk phenomenon gradually becomes serious. When there are a/b=0.0625 and a=0.2 μs, the crosstalk level reaches the highest.

When the scanning period H of the gate driving signal is 8.7 μs, in order to ensure that the crosstalk phenomenon is alleviated, the ratio a/b of the first time difference to the second time difference may ranges from 1.27 to 16, and the range of the first time difference may be set to 1.9 μs to 3.2 μs.

For example, four test points are arbitrarily selected in a display area of the display panel including the pixel circuit shown in FIG. 5A, and crosstalk tests are performed for the test points. Crosstalk test values in the horizontal and vertical directions of each test point are measured by using the method of setting the timing of the gate driving signal and the duration of the latch input period. For the same display panel, under the same test condition, the crosstalk test values of the four test points are shown in Table 2 in a comparison solution, and the crosstalk test values of the four test points using the technical solution according to the embodiments of the present disclosure are shown in Table 3. In the above-mentioned comparison solution, the duration of the latch input period is 1.5 μs, and the ratio a/b of the first time difference to the second time difference is 1. For example, both the first time difference and the second time difference may be set to be the default value of 1.7 μs. In the technical solution according to the embodiments of the present disclosure, the duration of the latch input period is 0.4 μs, the ratio a/b of the first time difference to the second time difference ranges from 1.27 to 16, and the ratio of the first time difference to the duration of the latch input period ranges from 4.75 to 8. For example, the first time difference is 3.2, the second time difference is 0.2, and the ratio of the first time difference to the duration of the latch input period is 8.

TABLE 2

| | Direction | 1 | 2 | 3 | 4 |
|---|---|---|---|---|---|
| Crosstalk test value | H | 0.95% | 2.35% | 1.90% | 0.70% |
| | V | 0.22% | 0.20% | 0.20% | 0.20% |

TABLE 3

| | Direction | 1 | 2 | 3 | 4 |
|---|---|---|---|---|---|
| Crosstalk test value | H | 1.04% | 0.95% | 1.20% | 0.77% |
| | V | 0.27% | 0.41% | 0.27% | 0.13% |

As shown in Table 2, by using the above-mentioned comparison solution, the crosstalk test value of the test point 2 in the horizontal direction H is 2.35%, which indicates that there is serious crosstalk at the test point 2 in the horizontal direction. As shown in Table 3, according to the technical solution of the embodiments of the present disclosure, each of the crosstalk test values of the four test points in the horizontal and vertical directions is less than 2.00%, which indicates that almost no crosstalk occurs at all the test points according to the technical solution of the embodiments of the present disclosure. The crosstalk test value of the test point 2 in the horizontal direction H is 0.95%, which indicates that almost no crosstalk occurs at the test point 2 in the horizontal direction. The above thus may verify that the crosstalk phenomenon may be improved by using the method of setting the timing of the gate driving signal and the duration of the latch input period, and after the ratio a/b of the first time difference to the second time difference is increased, the crosstalk of the display panel may be alleviated.

The present disclosure further tests and improves the crosstalk of the display panel in various operation modes. For example, the operation modes include a high-frequency drive mode and a low-frequency drive mode. For example, in a first drive mode, the first time difference is A1, for example, there is A1=2.6 μs–3 μs; in a second drive mode, the first time difference is A2, and there is A1=2.0 μs–2.4 μs, where the first time difference is A1 greater than A2. Optionally, the first drive mode is the high-frequency drive mode (e.g., 60 HZ to 240 HZ), and the second drive mode is the low-frequency drive mode (e.g., 10 HZ to 50 HZ). The second drive mode may also be the high-frequency drive mode (e.g., 60 HZ to 240 HZ), and the first drive mode may be the low-frequency drive mode (e.g., 10 HZ to 50 HZ). In an embodiment, in order to alleviate the crosstalk of the display panel, the first time difference in the high-frequency drive mode (120 HZ) is less than the first time difference in the low-frequency drive mode (30 HZ).

According to the embodiments of the present disclosure, the timing of the gate driving signal and/or the duration of the latch input period may be set such that the ratio of the first time difference to the second time difference is greater than 1. When the first time difference is greater than 0.5 times of the effective time difference, there is a large interval between the jumping of the power supply voltage ELVDD and the effective level of the gate driving signal, and the noise caused by the jumping of the power supply voltage ELVDD may be eliminated before the start time instant of the effective level of the gate driving signal. Before the start time instant of the effective level of the gate driving signal Gate, the jumped power supply voltage ELVDD is substantially recovered to the normal power supply voltage ELVDD, so as to avoid writing the noise into the storage capacitor CST, thereby improving the crosstalk phenomenon.

In an embodiment of the present disclosure, a timing of the light emission control signal EM may further be set based on the timing of the gate driving signal. Since the start time instant of the effective level of the gate driving signal is delayed with respect to the start time instant of the effective level in the normal timing, the reset signal Rese1 may be set such that the start time instant of the effective level of the reset signal Rese1 is delayed by the same amplitude as the start time instant of the effective level of the gate driving signal, while maintaining the duration of the effective level of the reset signal Rese1. Therefore, the duration of the effective level of the light emission control signal in a previous scanning period may be extended with respect to a default duration of the effective level of the light emission control signal by setting the timing of the light emission control signal. By extending the duration of the effective level of the light emission control signal, an average current density may be reduced, so as to extend a service life of the light-emitting element EL.

Figure 6:
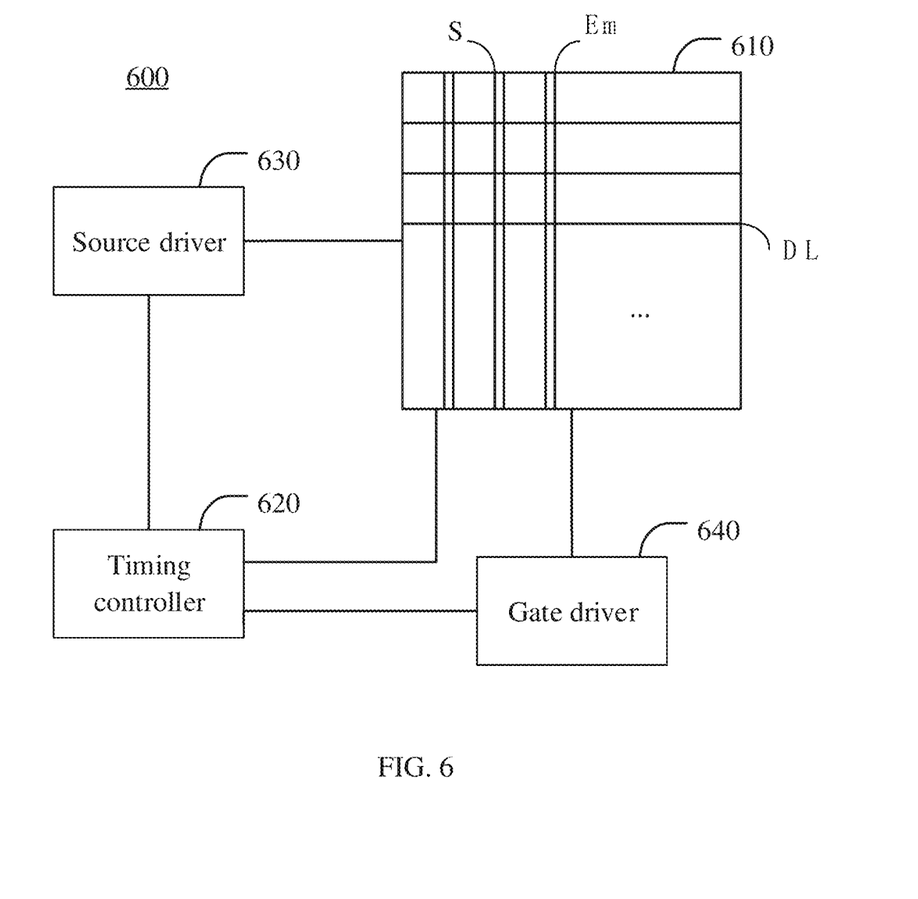
FIG. 6 shows a block diagram of a display device according to an embodiment of the present disclosure.

FIG. 6 shows a block diagram of a display device according to an embodiment of the present disclosure. As shown in FIG. 6, the display device 600 may include: a pixel array 610, a timing controller 620, a source driver 630, and a gate driver 640.

The pixel array 610 includes a plurality of pixels. The plurality of pixels are in an intersection region of a plurality of scanning lines S, a plurality of data lines DL and a plurality of light emission control lines EM.

The source driver 630 is configured to generate a data signal under the control of the timing controller 620. The gate driver 640 is configured to generate a gate driving signal under the control of the timing controller 620.

The timing controller 620 is configured to set a timing of the gate driving signal based on an effective time difference between the data signal and an effective signal of the gate driving signal, so as to drive the pixel array by using the gate driving signal.

The timing controller 620, the source driver 630, and the gate driver 640 are configured to perform the driving method in the embodiments described above, so as to drive the pixel array 610. The timing controller 620 is configured to perform operation S210 described above, and details will not be repeated here.

For example, the effective time difference includes a first time difference between an application time instant of the data signal and a start time instant of the effective level of the gate driving signal. The timing controller 620 is further configured to set the timing of the gate driving signal such that the first time difference between the application time instant of the data signal and the start time instant of the effective level of the gate driving signal is greater than 0.5 times of the effective time difference and less than the effective time difference, while maintaining a duration of the data signal and a duration of the effective level of the gate driving signal.

For example, a ratio of the effective time difference to a scanning period of the gate driving signal ranges from 35% to 45%.

For example, the ratio of the effective time difference to the scanning period of the gate driving signal is 39%.

For example, a ratio of the first time difference to the scanning period of the gate driving signal ranges from 22% to 37%.

For example, the scanning period of the gate driving signal is 8.7 μs, and the first time difference ranges from 1.9 μs to 3.2 μs.

For example, the first time difference is greater than a jumping time of the power supply voltage, and the jumping time of the power supply voltage is related to a reference voltage of the data signal.

For example, the timing controller 620 is further configured to set a duration of a latch input period based on the effective time difference, such that a time difference between an end time instant of the latch input period and the start time instant of the effective level of the gate driving signal in a next scanning period is less than the effective time difference.

Figure 7:
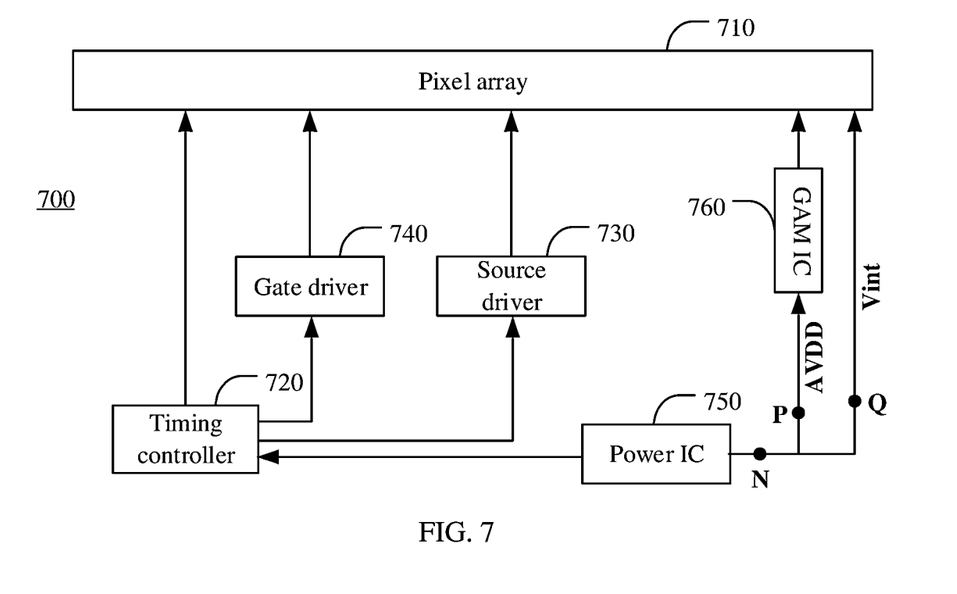
FIG. 7 shows a block diagram of a display device according to another embodiment of the present disclosure.

FIG. 7 shows a block diagram of a display device according to another embodiment of the present disclosure.

A display device 700 may include a pixel array 710, a timing controller 720, a source driver 730, a gate driver 740, a power supply chip Power IC 750, and a gamma correction chip GAM IC 760.

The pixel array 710, the timing controller 720, the source driver 730 and the gate driver 740 have functions similar to the pixel array 610, the timing controller 620, the source driver 630 and the gate driver 640 included in the display device shown in FIG. 6, and details will not be repeated in the present disclosure for the sake of brevity.

The power supply chip Power IC 750 is used to input the reference voltage AVDD of the data signal to the gamma correction chip GAMIC 760. The gamma correction chip GAM IC 760 is used to perform gamma correction on the reference voltage AVDD of the data signal, and input the corrected reference voltage AVDD of the data signal to the pixel array 610. The power supply chip Power IC 750 is further configured to input an initialization signal VINT to the pixel array 610.

In an embodiment of the present disclosure, a water ripple phenomenon test and a crosstalk test may be performed on the display panel by providing external devices, such as an external power supply, a stabilizing capacitor, or a filter resistor, at an N point, a P point, and a Q point as shown in FIG. 7.

For example, in order to test the water ripple phenomenon and the crosstalk phenomenon of the display panel under different hardware conditions, the water ripple test and the crosstalk test are performed on the display panel including the pixel circuit shown in FIG. 5A. The hardware conditions for the tests include: providing relevant external devices at the N point, the P point and the Q point on a path of inputting the reference voltage of the data signal as shown in FIG. 7, changing an operation mode of Power IC 750, and replacing Power IC 750 with Power IC 2. The duration of the latch input period of the data line input during the test includes 0.4 μs and 1.5 μs. The test results are shown in Table 4. N indicates a presence of the phenomenon shown in the table, and Y indicates an absence of the phenomenon shown in the table. Since the water ripple phenomenon is not improved when the external devices are provided at the point Q, test results of providing relevant external devices at the point Q are not shown in Table 4.

TABLE 4

| Hardware condition | Water ripple | | Crosstalk | |
| --- | --- | --- | --- | --- |
| | 1.5 μs | 0.4 μs | 1.5 μs | 0.4 μs |
| Providing the external power supply at the N point | N | N | Y | N |
| Providing the external power supply at the P point | N | N | Y | N |
| Providing the stabilizing capacitor at the N point | N | Y | Y | N |
| Providing the filter resistor at the N point | N | N | Y | N |
| Using another power supply chip Power IC 2 | N | N | Y | N |
| Setting the power supply chip to adopt an power-saving operation mode | N | Y | Y | N |
| Setting the power supply chip to adopt a conventional operation mode | N | N | Y | N |

As shown in Table 4, when the duration of the latch input period is set to be 1.5 µs, the crosstalk phenomenon occurs to each of the display panels of the display devices shown in Table 4. When the duration of the latch input period is set to be 0.4 µs, it may be considered that there is no crosstalk phenomenon. When the duration of the latch input period is set to be 0.4 µs, it may be considered that: there is no water ripple phenomenon when the external power supply is provided at the N point or the P point, there is no water ripple phenomenon when the filter resistor is provided at the N point, there is no water ripple phenomenon when the power IC 750 adopts the conventional operation mode instead of the power-saving mode, and there is no water ripple phenomenon when the power IC 750 is replaced with the other power supply chip.

According to the embodiments of the present disclosure, the reference voltage of the data signal may be optimized by providing the external power supply or the filter resistor between the power supply chip Power IC 750 and the gamma correction chip GAM IC 760, so as to improve the water ripple problem. The external power supply or the filter resistor may also be provided between the power supply chip Power IC 750 and the pixel array 710 so as to optimize the reference voltage of the data signal, which may in turn alleviate the water ripple problem.

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, a program segment, or a part of codes, and the module, the program segment, or the part of the codes contains one or more executable instructions for implementing the specified logical function. It should also be noted that, in some alternative implementations, the functions noted in the blocks may occur in an order different from the order noted in the drawings. For example, two blocks shown in succession may, in fact, be performed substantially concurrently, or the two blocks may sometimes be performed in a reverse order, depending upon the functions involved. It should also be noted that each block of the block diagrams or flowcharts, and combinations of the blocks in the block diagrams or flowcharts, may be implemented by using a special purpose hardware-based system that performs the specified functions or operations, or may be implemented by using a combination of a special purpose hardware and computer instructions.

Those skilled in the art will understand that features recited in the various embodiments of the present disclosure and/or the claims may be combined and/or integrated in a variety of ways, even if such combinations or integrations are not explicitly recited in the present disclosure. In particular, the features recited in the various embodiments of the present disclosure and/or the claims may be combined and/or integrated without departing from the spirit and teachings of the present disclosure, and all such combinations and/or integrations fall within the scope of the present disclosure.

Embodiments of the present disclosure have been described above. However, these embodiments are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A driving method for driving a pixel array, comprising:
setting a timing of a gate driving signal based on an effective time difference between a data signal and an effective signal of the gate driving signal; and
driving the pixel array by using the gate driving signal,
wherein the effective time difference comprises a first time difference between an application time instant of the data signal and a start time instant of an effective level of the gate driving signal, and setting the timing of the gate driving signal based on the effective time difference comprises:
setting the timing of the gate driving signal such that the first time difference is greater than 0.5 times of the effective time difference and less than the effective time difference, while maintaining a duration of the data signal and a duration of the effective level of the gate driving signal.

2. The method according to claim 1, wherein a ratio of the effective time difference to a scanning period of the gate driving signal ranges from 35% to 45%.

3. The method according to claim 2, wherein the ratio of the effective time difference to the scanning period of the gate driving signal is 39%.

4. The method according to claim 1, wherein a ratio of the first time difference to a scanning period of the gate driving signal ranges from 22% to 37%.

5. The method according to claim 2, wherein the scanning period of the gate driving signal is 8.7 µs, and the first time difference ranges from 1.9 µs to 3.2 µs.

6. The method according to claim 1, wherein the first time difference is greater than a jumping time of a power supply voltage.

7. The method according to claim 1, further comprising:
setting a duration of a latch input period based on the effective time difference such that a time difference between an end time instant of the latch input period and a start time instant of an effective level of a gate driving signal in a next scanning period is greater than 0.5 times of the effective time difference and less than the effective time difference.

8. The method according to claim 1, further comprising:
a first driving mode, wherein the first time difference is A1; and a second driving mode, wherein the first time difference is A2, and A1 is greater than A2.

9. A display device, comprising:
a pixel array;
a timing controller;
a source driver configured to generate a data signal under control of the timing controller; and
a gate driver configured to generate a gate driving signal under control of the timing controller,
wherein the timing controller is configured to:
set a timing of the gate driving signal based on an effective time difference between the data signal and an effective signal of the gate driving signal, so as to drive the pixel array by using the gate driving signal; and
wherein the effective time difference comprises a first time difference between an application time instant of the data signal and a start time instant of an effective level of the gate driving signal; and
the timing controller is further configured to:

set the timing of the gate driving signal so that the first time difference between the application time instant of the data signal and the start time instant of the effective level of the gate driving signal is greater than 0.5 times of the effective time difference and less than the effective time difference, while maintaining a duration of the data signal and a duration of the effective level of the gate driving signal.

10. The display device according to claim 9, wherein a ratio of the effective time difference to a scanning period of the gate driving signal ranges from 35% to 45%.

11. The display device according to claim 9, wherein a ratio of the effective time difference to a scanning period of the gate driving signal is 39%.

12. The display device according to claim 9, wherein a ratio of the first time difference to a scanning period of the gate driving signal ranges from 22% to 37%.

13. The display device according to claim 10, wherein the scanning period of the gate driving signal is 8.7 μs, and the first time difference ranges from 1.9 μs to 3.2 μs.

14. The display device according to claim 9, wherein the first time difference is greater than a jumping time of a power supply voltage.

15. The display device according to claim 9, wherein the timing controller is further configured to set a duration of a latch input period based on the effective time difference, such that a time difference between an end time instant of the latch input period and a start time instant of an effective level of a gate driving signal in a next scanning period is greater than 0.5 times of the effective time difference and less than the effective time difference.

16. The display device according to claim 9, further comprising:
an external power supply provided between the pixel array and a voltage source of the source driver.

17. The display device according to claim 9, further comprising:
a resistor provided between the pixel array and a voltage source of the source driver.

18. The display device according to claim 9, wherein the timing controller is further configured to set: a first driving mode, wherein the first time difference is A1; and a second driving mode, wherein the first time difference is A2, and A1 is greater than A2.

* * * * *